US011876692B2

(12) United States Patent
Mazzitelli et al.

(10) Patent No.: US 11,876,692 B2
(45) Date of Patent: Jan. 16, 2024

(54) CUSTOMIZABLE VISUALIZATION OF A TRAFFIC TOPOLOGY OF A SERVICE MESH

(71) Applicant: RED HAT, INC., Raleigh, NC (US)

(72) Inventors: John Joseph Mazzitelli, Sicklerville, NJ (US); Jay Shaughnessy, Cherry Hill, NJ (US)

(73) Assignee: Red Hat, Inc., Raleigh, NC (US)

(*) Notice: Subject to any disclaimer, the term of this patent is extended or adjusted under 35 U.S.C. 154(b) by 11 days.

(21) Appl. No.: 17/526,834

(22) Filed: Nov. 15, 2021

(65) Prior Publication Data
US 2023/0155904 A1 May 18, 2023

(51) Int. Cl.
H04L 43/062 (2022.01)
H04L 43/0882 (2022.01)
H04L 43/0811 (2022.01)
H04L 43/045 (2022.01)

(52) U.S. Cl.
CPC .......... *H04L 43/062* (2013.01); *H04L 43/045* (2013.01); *H04L 43/0811* (2013.01); *H04L 43/0882* (2013.01)

(58) Field of Classification Search
CPC . H04L 43/045; H04L 43/062; H04L 43/0811; H04L 43/0882
See application file for complete search history.

(56) References Cited

U.S. PATENT DOCUMENTS

| 5,768,552 A * | 6/1998 | Jacoby | G06T 11/206 709/224 |
| 6,321,252 B1 * | 11/2001 | Bhola | H04N 7/15 348/E7.083 |
| 7,143,159 B1 * | 11/2006 | Grace | H04L 41/22 709/224 |
| 11,030,068 B1 * | 6/2021 | Agarwal | G06N 5/025 |
| 11,265,292 B1 * | 3/2022 | Leviseur | H04L 63/1433 |
| 11,347,625 B1 * | 5/2022 | Agarwal | G06F 11/323 |
| 2006/0002681 A1 * | 1/2006 | Spilo | H04N 21/4305 386/220 |
| 2011/0141923 A1 * | 6/2011 | Young | H04L 43/12 370/252 |
| 2013/0246576 A1 * | 9/2013 | Wogsberg | H04N 21/654 709/219 |
| 2015/0295778 A1 * | 10/2015 | Hsiao | H04L 43/0894 715/736 |

(Continued)

OTHER PUBLICATIONS

Mars, R. (2021). "Kubernetes observability with a service mesh," Buoyant, pp. 9.

(Continued)

Primary Examiner — Jerry B Dennison
(74) Attorney, Agent, or Firm — Womble Bond Dickinson (US) LLP

(57) ABSTRACT

A request for a traffic topology of a service mesh including traffic between multiple services that utilize multiple communication protocols is received. In response to receiving the request, metric data associated with the traffic between the multiple services is acquired. The traffic topology of the traffic between the multiple services is generated using the metric data, the traffic topology illustrating corresponding traffic for one or more of the multiple communication protocols and one or more metrics associated with the corresponding traffic.

20 Claims, 10 Drawing Sheets

(56) References Cited

U.S. PATENT DOCUMENTS

| | | | | |
|---|---|---|---|---|
| 2015/0295779 | A1* | 10/2015 | Ching | H04L 43/022 |
| | | | | 715/733 |
| 2015/0295780 | A1* | 10/2015 | Hsiao | H04L 43/022 |
| | | | | 715/736 |
| 2016/0285706 | A1* | 9/2016 | Rao | H04L 41/40 |
| 2017/0272331 | A1* | 9/2017 | Lissack | H04L 43/20 |
| 2019/0303385 | A1* | 10/2019 | Ching | G06F 16/26 |
| 2019/0372858 | A1* | 12/2019 | Krishnamurthy | H04L 41/22 |
| 2020/0366574 | A1* | 11/2020 | Schubert | H04L 41/5032 |
| 2020/0366580 | A1* | 11/2020 | Sinha | H04L 43/0852 |
| 2020/0412763 | A1* | 12/2020 | Mercian | H04L 41/0843 |
| 2021/0144181 | A1* | 5/2021 | Mishra | H04L 43/062 |
| 2021/0160214 | A1* | 5/2021 | Jain | G06F 21/6218 |
| 2021/0191706 | A1* | 6/2021 | Sn | G06F 11/3466 |
| 2021/0204091 | A1* | 7/2021 | Schubert | H04L 41/5051 |
| 2021/0226865 | A1* | 7/2021 | Gupta | H04L 43/045 |
| 2021/0226887 | A1* | 7/2021 | Mereddy | H04L 43/20 |
| 2022/0043811 | A1* | 2/2022 | Salvat Lozano | H04L 41/5009 |
| 2022/0173979 | A1* | 6/2022 | Wickes | H04L 41/147 |
| 2022/0247647 | A1* | 8/2022 | Brockbank | H04L 43/0811 |
| 2023/0033521 | A1* | 2/2023 | Oliveira | H04L 41/046 |

OTHER PUBLICATIONS

"Exploring Anthos Service Mesh in the Cloud Console" Google Cloud, pp. 11.

* cited by examiner

CUSTOMIZABLE VISUALIZATION OF A TRAFFIC TOPOLOGY OF A SERVICE MESH

TECHNICAL FIELD

Aspects of the present disclosure relate to a service mesh, and more particularly, to the customizable visualization of a traffic topology of a service mesh.

BACKGROUND

Microservice architecture is an architectural style of a computing system that structures an application as a collection of services. The services can be independently developed, tested and deployed by different teams. The services include one or more workloads that are to be executed by execution environments supported by host systems of the microservice architecture. Microservice architectures enable the deployment of large, complex applications at a rapid pace.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
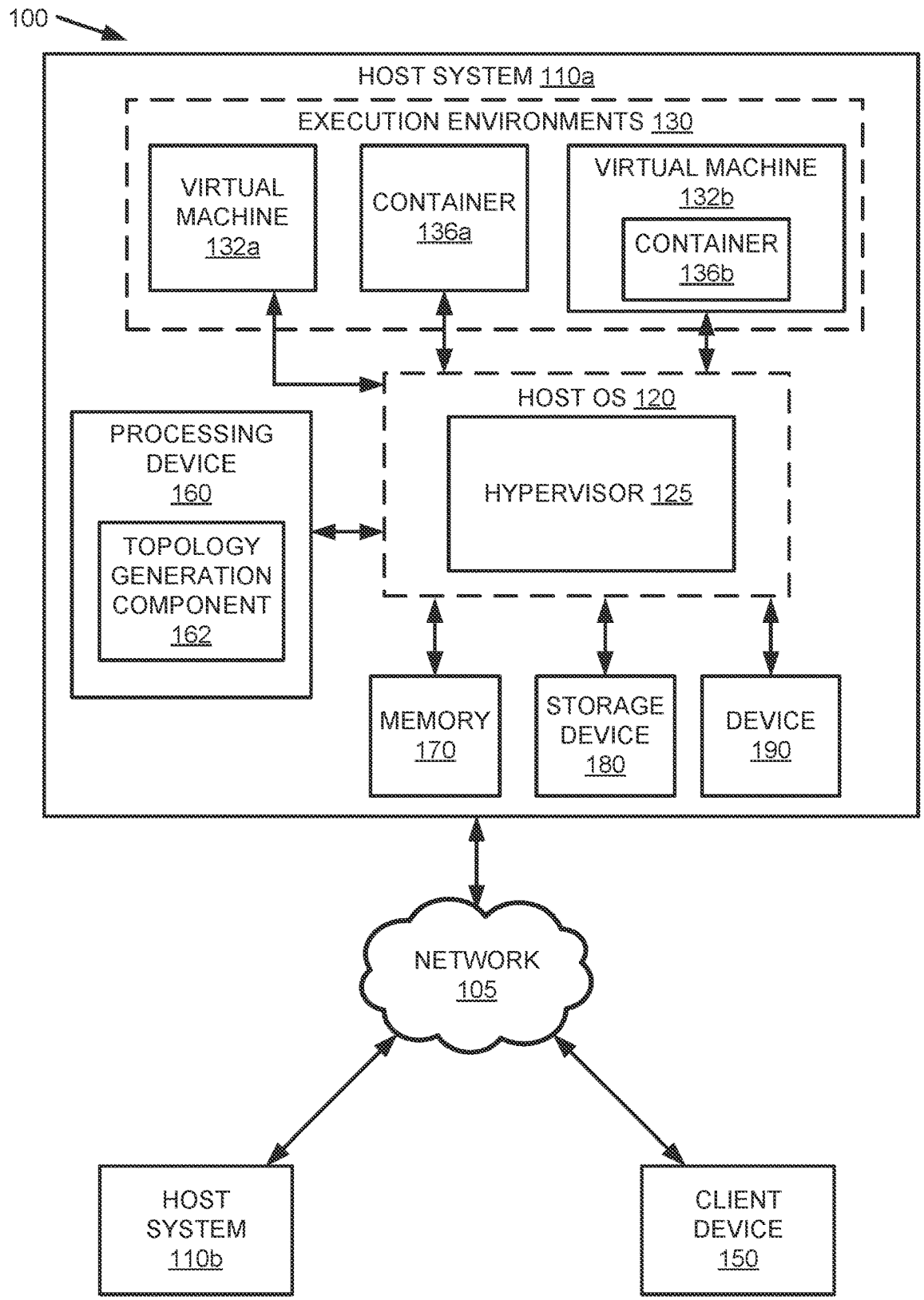
FIG. 1 is a block diagram that illustrates an example computing architecture, in accordance with some embodiments.

On a microservice architecture, an application may be made up of multiple services. Each of the services may include one or more workloads, such as method calls or internal processes. These workloads may be executed using one or more execution environments, such as virtual machines (VMs), containers, or containers within VMs, which are supported by one or more host systems of the microservice architecture. The microservice architecture may include a service mesh, which is a dedicated infrastructure layer for facilitating communications between the various services of the microservice architecture. The communications may be transmitted between the services using a variety of different communication protocols. For example, communications may be transmitted between the services using a remote procedure call (RPC), such as gRPC, a hypertext transfer protocol (HTTP), a transmission control protocol (TCP), or other types of communication protocols.

These different communication protocols may be monitored by examining different metrics associated with the communication protocols. For example, HTTP traffic may be monitored by looking at its request rates (e.g., how fast or slow are requests being made), while gRPC traffic may be monitored using multiple metrics. The gRPC traffic may be monitored in a similar fashion as HTTP (e.g., request rates), how many messages are being sent or how many messages are being sent back (e.g., responses), or how many total messages (e.g., requests and responses) are sent via gRPC connections. In another example, the TCP connections may be analyzed by examining how many bytes of data are sent via the TCP connections, how many bytes of data are received via the TCP connections, or the total bytes of data transmitted via the TCP connections.

Some components of the service mesh may utilize one communication protocol, while other components may utilize multiple communication protocols. For example, a mesh component may send only HTTP requests, or it may send HTTP requests to one endpoint, while making gRPC requests to another endpoint. These communications between components (e.g., services) of the service mesh may be visualized using a mesh graph presented in a user interface. The mesh graph may show the topology of the flow of traffic between the different services of the service mesh. A conventional mesh graph, however, may visualize communications in a service mesh using the difference communication protocols. This may become problematic when a user wishes to examine communications utilizing a particular communication protocol, particularly in a large service mesh with many services that utilize many different communication protocols, as the mesh graph may become noisy with many edges connecting many services of the service mesh. This may make it difficult to analyze portions of the service mesh that are of interest to a user.

Another issue with conventional mesh graphs occurs when some communication protocols are used in different fashions. In such instances, the visualization of the mesh graph may be different in appearance depending on how the service mesh is implemented. For example, some gRPC traffic involves short-lived request/response traffic, while other gRPC traffic may involve long-lived connections with request messages across a single connection. Depending on how the mesh graph is generated, some of the gRPC traffic may be under-represented or may not even be present in the visualization.

In an example scenario, the metric of gRPC requests per second may be monitored and used to generate a mesh graph. For short-lived gRPC connections, a mesh component may make 100 gRPC requests per second, where the request is a single message that is sent, and the connection is subsequently closed. Conversely, for long-lived gRPC connections, a mesh component may send messages at a rate of 100 requests per second over the lifespan of the long-lived connection. While the total number of messages transmitted via the long-lived gRPC connections may greatly exceed the total number of messages transmitted via the short-lived gRPC connections, the traffic data for these connections may appear the same on the mesh graph because both of these connections are transmitting requests at a rate of 100 requests per second.

Aspects of the disclosure address the above-noted and other deficiencies by generating a customizable visualization of a traffic topology of a service mesh. Processing logic of a processing device may receive a request for a traffic topology of a service mesh. In response to receiving the request, the processing logic may acquire metric data associated with the traffic between services of the service mesh. The metric data for the traffic may include one or more of which services the communications are transmitted between, the type(s) of communication protocol used, a number of messages per second that are transmitted, a number of messages that are transmitted, or the like. The processing logic may utilize the metric data to generate a user interface that visualizes the traffic topology of the service mesh. The user interface may include a visual representation of the flow of traffic between the different services of the service mesh and one or more corresponding metrics associated with the flow of traffic.

The user interface may allow for the selection of different communication protocols and/or metrics to be displayed. For example, the user interface may receive a selection of a particular protocol and/or particular metric of the service mesh to be displayed via the user interface. The processing logic may then generate a subsequent user interface that includes a visualization of the traffic topology that includes the particular communication protocol/metric, while bypassing including other communication protocols/metrics.

By providing a customizable visualization of a traffic topology of a service mesh, a user may be able to quickly and easily attain relevant information to accurately describe the flow of traffic between services of the service mesh. The customizable visualization of the traffic topology may enable a more efficient allocation of computing resources of the microservice architecture to the various services of the service mesh, improving the performance of the microservice architecture.

FIG. 1 depicts a high-level component diagram of an illustrative example of a computing architecture 100, in accordance with one or more aspects of the present disclosure. However, other computing architectures 100 are possible, and the implementation of a computer system utilizing examples of the disclosure are not necessarily limited to the specific architecture depicted by FIG. 1.

As shown in FIG. 1, computing architecture 100 includes host systems 110a, b and client device 150. The host systems 110a, b and client device 150 include one or more processing devices 160, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing device 160. It should be noted that although, for simplicity, a single processing device 160, storage device 180, and device 190 are depicted in FIG. 1, other embodiments of host systems 110a, b and client device 150 may include multiple processing devices, storage devices, or devices. Processing device 160 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 160 may also include one or more special-purpose processing devices such as an application specific integrated circuit (ASIC), a field programmable gate array (FPGA), a digital signal processor (DSP), network processor, or the like.

The host systems 110a, b and client device 150 may be a server, a mainframe, a workstation, a personal computer (PC), a mobile phone, a palm-sized computing device, etc. In embodiments, host systems 110a, b and client device 150 may be separate computing devices. In some embodiments, host systems 110a, b and client device 150 may be implemented by a single computing device. For clarity, some components of host system 110b and client device 150 are not shown. Although computing architecture 100 is illustrated as having two host systems, embodiments of the disclosure may utilize any number of host systems.

Host systems 110a, b may additionally include execution environments 130, which may include one or more virtual machines (VMs) 132a, containers 136a, containers 136b residing within virtual machines 132b, and host operating system (OS) 120. VM 132a and VM 132b are software implementations of machines that execute programs as though they were actual physical machines. Container 136 acts as isolated execution environments for different workloads of services, as previously described. In embodiments, VMs 132a, b and/or containers 136a, b may serve as execution environments for one or more services of a service mesh. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 132a, b and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110a, b and client device 150 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110a, b and client device 150.

In embodiments, processing device 160 may execute a topology generation component 162. The topology generation component 162 may receive requests for traffic topologies of traffic between services of a service mesh. For example, the topology generation component 162 may receive a request for a traffic topology of a service mesh from client device 150. The topology generation component 162 may acquire metric data associated with the service mesh. In some embodiments, the topology generation component 162 may acquire the metric data from memory 170 or storage device 180 of host system 110a. In embodiments, topology generation component 162 may acquire the metric data from a separate host system, such as host system 110b. In some embodiments, the topology generation component 162 may be executed as a service in one or more execution environments 130 of host system 110a. Further details regarding topology generation component 162 will be discussed at FIGS. 2-9 below.

Figure 2:
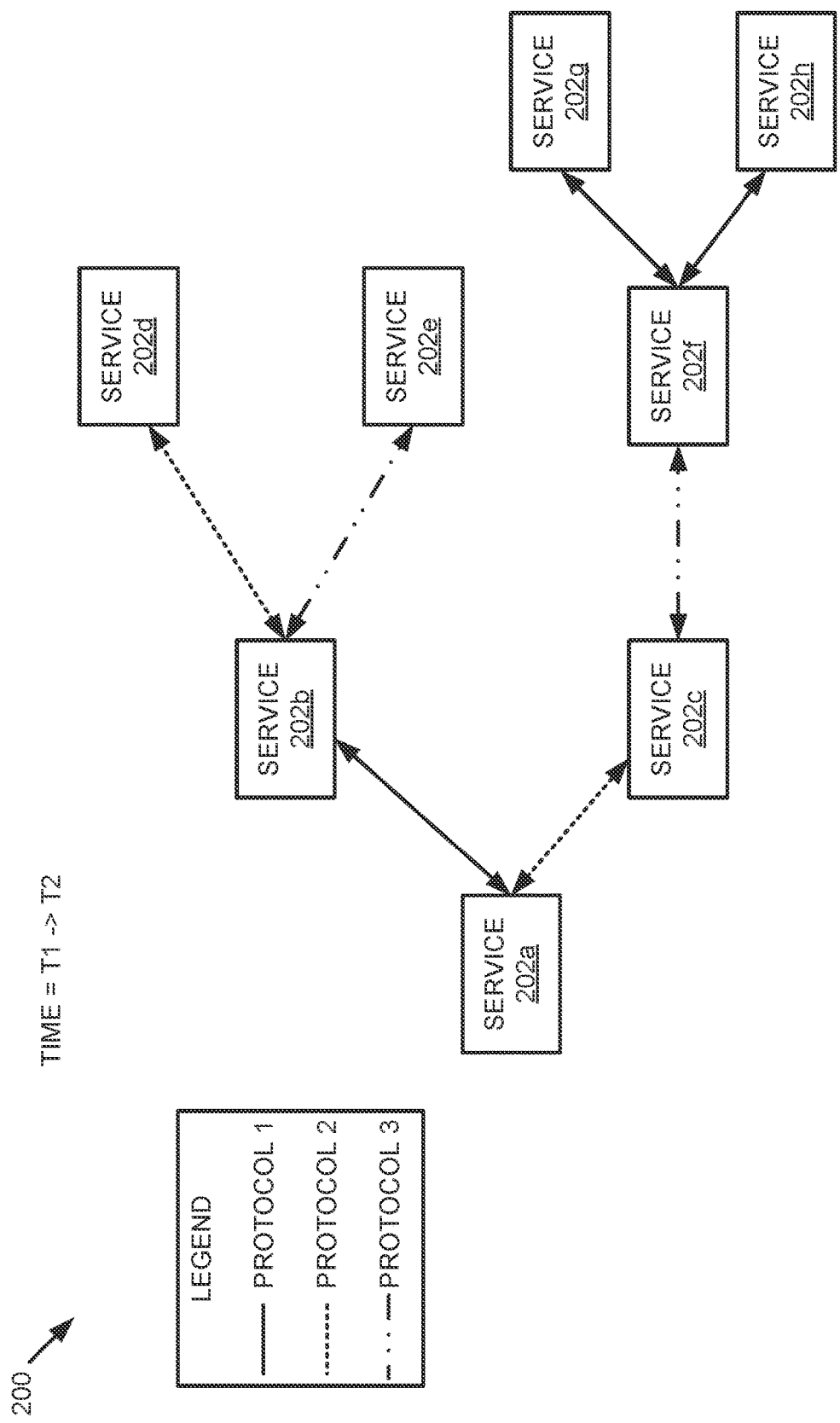
FIG. 2 is an illustration of an example of a traffic topology of a service mesh, in accordance with embodiments of the disclosure.

FIG. 2 is an illustration of an example of a traffic topology 200 of a service mesh, in accordance with embodiments of the disclosure. The traffic topology 200 may visualize the flow of traffic between services 202a-h of a service mesh. In some embodiments, traffic topology 200 may be generated in response to receiving a request for the traffic topology from a client device (e.g., client device 150 of FIG. 1). In embodiments, the request may indicate an amount of time that the traffic topology it to reflect. For example, the request may indicate that the traffic topology is to reflect the flow of traffic between services 202a-h from time=T1 to time=T2.

The traffic topology 200 may be generated by processing logic of a processing device from acquired metric data associated with the communications transmitted between services 202a-h. In some embodiments, the metric data may include which type of communication protocol is used to transmit the communications. In embodiments, the metric data may include information associated with bidirectional traffic between two services of the service mesh. In an embodiment, the metric data may include communication rates (e.g., how fast or slow are communications being made). In embodiments, the metric data may include how many messages are being sent or how many messages are being sent back (e.g., responses), or how many total messages (e.g., requests and responses) are sent. In some embodiments, the metric data may include how many bytes of data are sent, how many bytes of data are received, or the total bytes of data transmitted.

Services 202a-h may include one or more workloads, such as method calls or internal processes. Communication traffic may be transmitted between different services 202a-h, which are shown as arrows between the difference services of services 202a-h. As previously described, the communications transmitted between the services 202a-h may be transmitted using different types of communication protocols.

Referring to FIG. 2, the traffic topology of the service mesh includes communications between services using three different types of communication protocols as shown in the legend illustrated in FIG. 2. Communications between services using protocol 1 are shown with arrows having a solid line, communications between services using protocol 2 are shown with arrows having a dashed line, and communications between services using protocol 3 are shown using lines having two dots and a dash.

Figure 3:
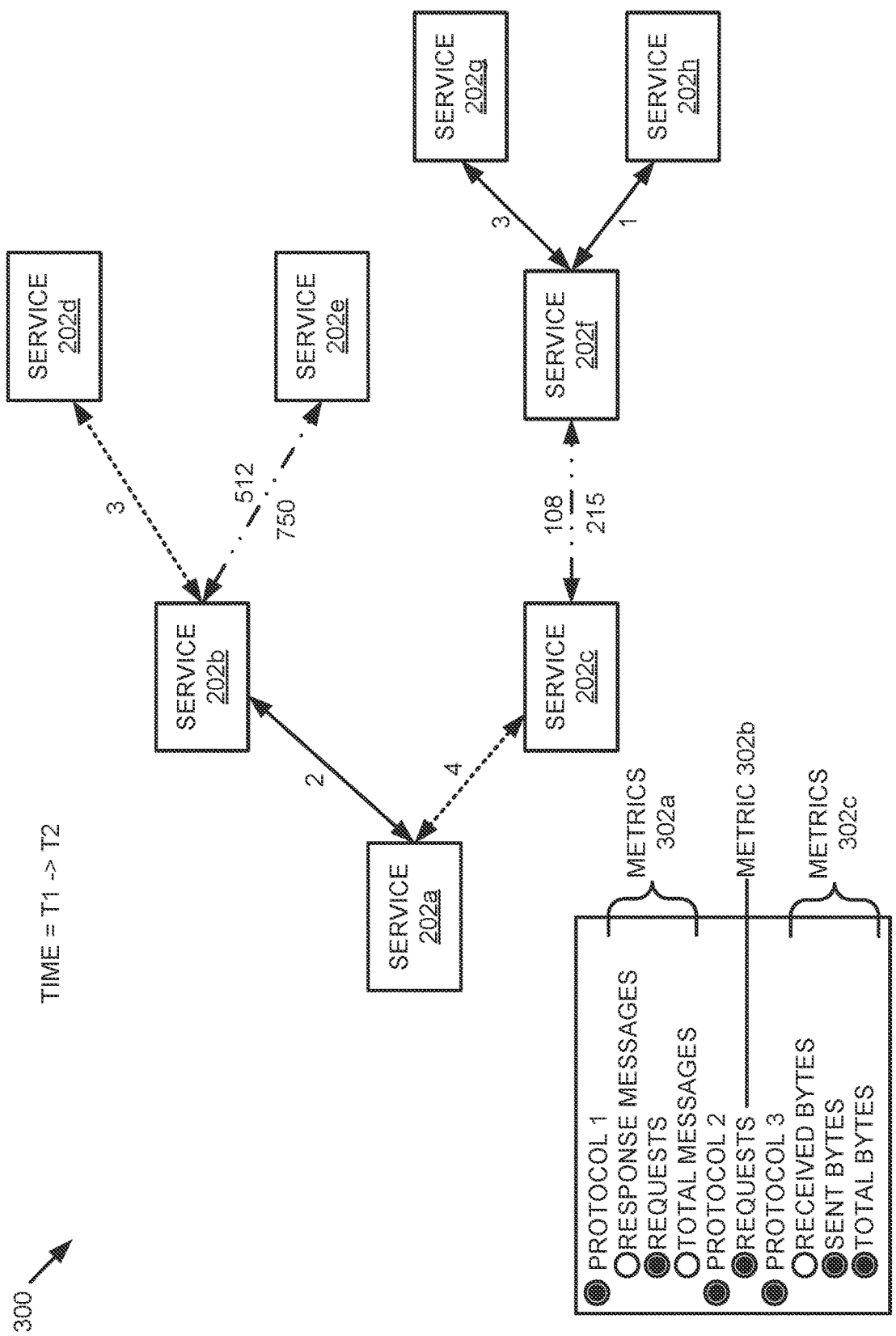
FIG. 3 is an illustration of an example of a user interface visualizing a traffic topology of a service mesh, in accordance with embodiments of the disclosure.

FIG. 3 is an illustration of an example of a user interface 300 visualizing a traffic topology of a service mesh, in accordance with embodiments of the disclosure. The user interface 300 may be utilized to present traffic topology 200 of FIG. 2 to a user. For example, user interface 300 may be provided to a client device (e.g., client device 150 of FIG. 1) of a user for presentation by the client device. The user interface 300 may include the traffic topology of the service mesh, as previously described at FIG. 2, and one or more corresponding metrics associated with the communications between the services 202a-h of the service mesh. The traffic topology presented by the user interface 300 may be customized by selections received via the user interface 300. For example, a user may provide a selection of a particular communication protocol and/or particular metric that is to be presented via the user interface 300.

Referring to FIG. 3, each of the communication protocols (e.g., protocol 1, protocol 2, and protocol 3 of FIG. 2) may include a corresponding selectable icon (shown as circles to the left of each protocol) that toggles whether or not each communication protocol is presented in the user interface 300 of the traffic topology. For example, in FIG. 3, the selectable icons to the left of protocol 1, protocol 2, and protocol 3 are each toggled so that each of the communication protocols are presented in the user interface 300.

As previously described, one or more corresponding metrics for the communication protocols may be presented by the user interface 300. Each of the communication protocols may include one or more corresponding metrics, which may include selectable icons to toggle whether or not each of the corresponding metrics are presented in the user interface 300.

Referring to FIG. 3, protocol 1 includes corresponding metrics 302a that correspond to a number of response messages received in the service mesh using protocol 1, a number of requests transmitted in the service mesh using protocol 1, and a total number of messages transmitted via the service mesh using protocol 1. Protocol 2 includes a corresponding metric 302b that corresponds to a number of requests that are transmitted in the service mesh using protocol 2. Protocol 3 includes corresponding metrics 302c that correspond to a number of bytes of data received in the service mesh using protocol 3, the number of sent bytes of data received in the service mesh using protocol 3, and the total number of bytes of data transmitted in the service mesh using protocol 3.

In FIG. 3, the selectable icons for requests sent using protocol 1, requests sent using protocol 2, the number of bytes of data sent using protocol 3, and the total number of bytes of data sent using protocol 3 are each toggled so that each of these metrics are presented in the user interface 300. Therefore, the number of requests sent using protocol 1 are presented in the traffic topology next to each of the communication pathways using protocol 1, the number of requests sent using protocol 2 are presented in the traffic topology next to each of the communication pathways using protocol 2, and the number of sent bytes and the total number of bytes transmitted using protocol 3 and presented next to each of the communication pathways using protocol 3.

Figure 4:
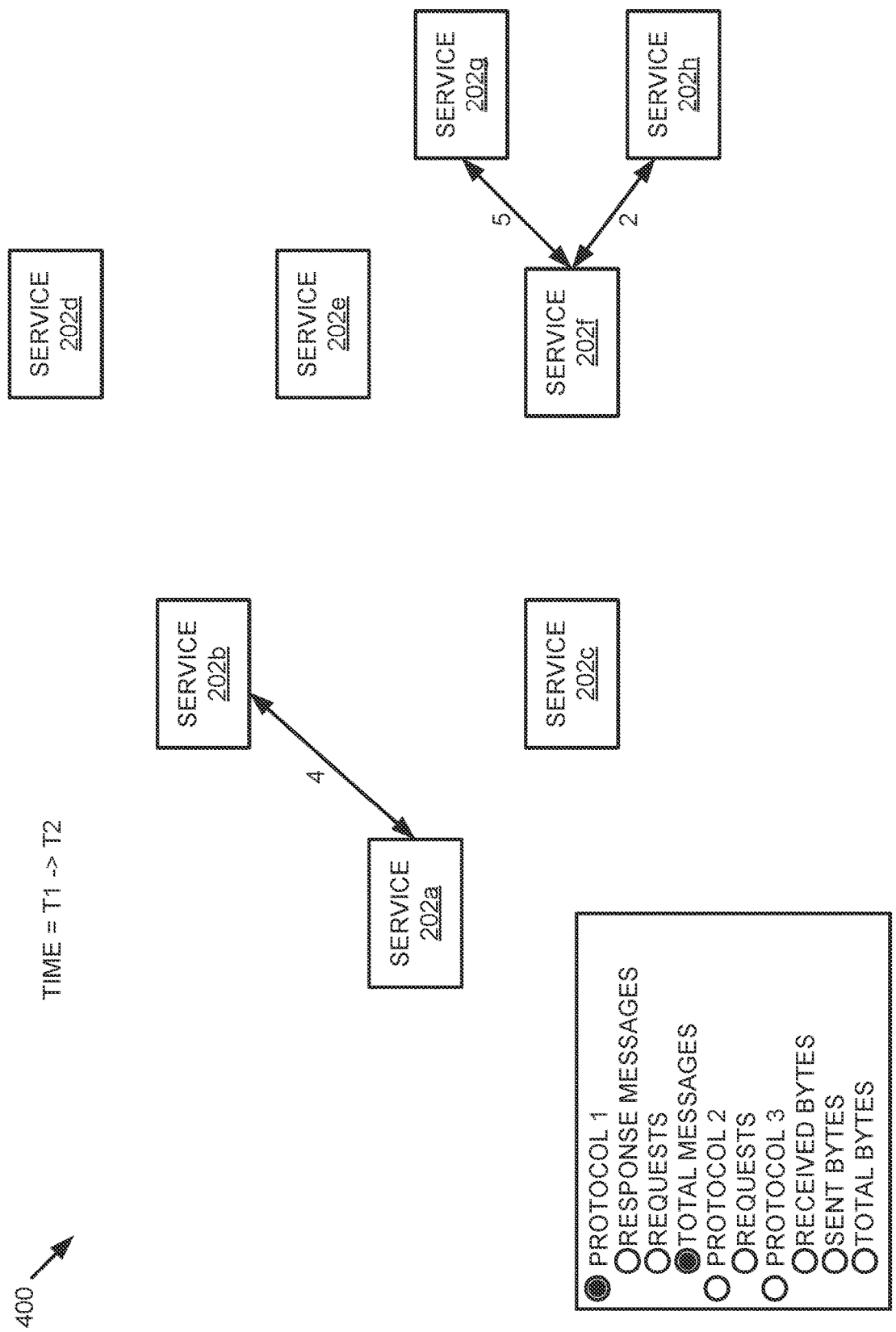
FIG. 4 is an illustration of an example of a user interface of a traffic topology that is customized in view of a selection, in accordance with embodiments of the disclosure.

FIG. 4 is an illustration of an example of a user interface 400 of a traffic topology that is customized in view of a selection, in accordance with embodiments of the disclosure. As previously described, the information shown in the user interface 400 may be customized via one or more selections that are made via the user interface 400. For example, a user may select one or more of the selectable icons of the user interface to toggle which communications protocols and/or corresponding metrics of the traffic topology are presented in the user interface 400.

Referring to FIG. 4, the selectable icon for protocol 1 has been selected, while the selectable icons for protocol 2 and protocol 3 have not been selected. Because the selectable icon for protocol 1 has been selected, the communications that are transmitted using protocol 1 are presented in the user interface 400. Because the selectable icons for protocol 2 and protocol 3 are not selected, communications that are transmitted using protocol 2 and protocol 3 are not presented in the user interface 400.

For protocol 1, the selectable icon for the total number of messages transmitted in the service mesh using protocol 1 has been selected, while the selectable icons for the number of response messages and the number of requests transmitted in the service mesh using protocol 1 have not been selected. Because the selectable icon for the total number of messages has been selected, this metric may be displayed in the user interface 400 next to the communication pathways using protocol 1.

Figure 5:
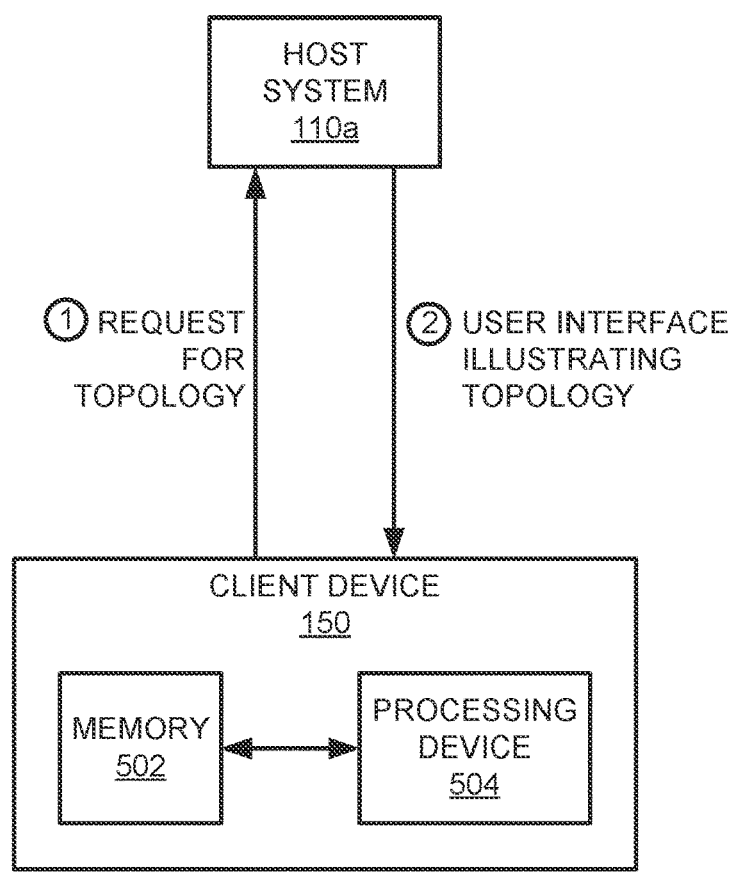
FIG. 5 is an illustration of an example of a computing architecture to provide a customizable user interface of a traffic topology, in accordance with embodiments of the disclosure.

FIG. 5 is an illustration of an example of a computing architecture 500 to provide a customizable user interface of a traffic topology, in accordance with embodiments of the disclosure. The computing architecture 500 includes host system 110a and client device 150, as previously described at FIG. 1.

The client device includes memory 502 that is operatively coupled to processing device 504. Memory 502 may include volatile memory devices (e.g., random access memory (RAM)), non-volatile memory devices (e.g., flash memory) and/or other types of memory devices. Processing device 504 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 504 may also include one or more special-purpose processing devices such as an application specific integrated circuit (ASIC), a field programmable gate array (FPGA), a digital signal processor (DSP), network processor, or the like.

Processing logic of processing device 504 may generate a request for a traffic topology of a service mesh. In some embodiments, the request may include an amount of time that the traffic topology is to reflect. Upon generating the request, the processing logic may transmit the request to host system 110a. Upon receipt of the request, processing logic of host system 110a may acquire metric data associated with the service mesh and generate a user interface illustrating the traffic topology, as previously described at FIG. 2-4. Host system 110a may transmit the user interface illustrating the traffic topology to the client device 150 for presentation by the client device 150.

Figure 6:
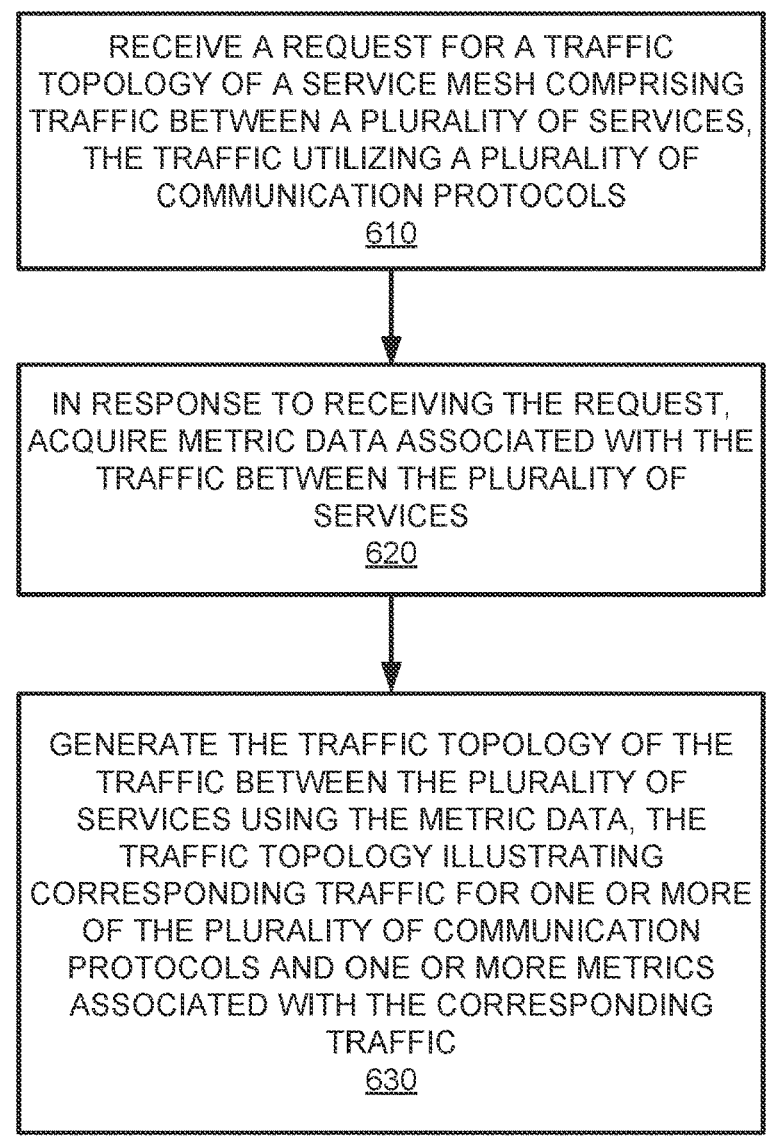
FIG. 6 is a flow diagram of a method of generating a traffic topology of a service mesh, in accordance with some embodiments.

FIG. 6 is a flow diagram of a method 600 of generating a traffic topology of a service mesh, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by topology generation component 162 of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where the processing logic receives a request for a traffic topology of a service mesh including traffic between multiple services that utilize multiple communication protocols.

At block 620, in response to receiving the request, the processing logic acquires metric data associated with the traffic between the multiple services.

At block 630, the processing logic generates the traffic topology of the traffic between the multiple services using the metric data. The traffic topology may illustrate corresponding traffic for one or more of the multiple communication protocols and one or more metrics associated with the corresponding traffic.

Figure 7:
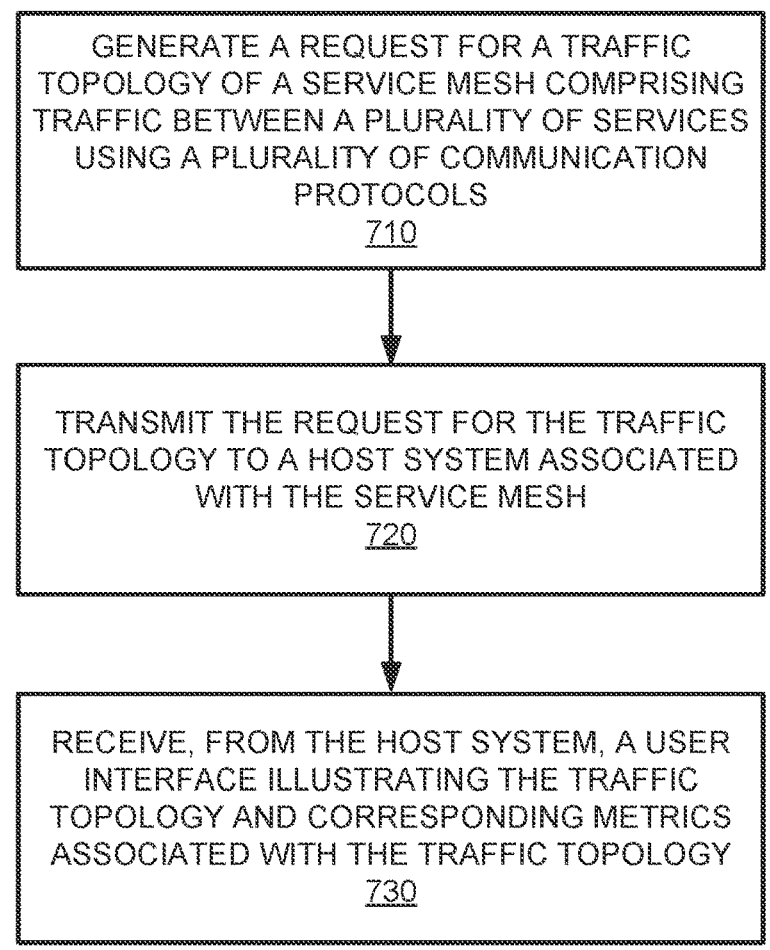
FIG. 7 is a flow diagram of a method of generating a request for a traffic topology, in accordance with some embodiments.

FIG. 7 is a flow diagram of a method 700 of generating a request for a traffic topology, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by processing device 504 of client device 150 of FIG. 5.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where the processing logic generates a request for a traffic topology of a service mesh including traffic between multiple services using multiple communication protocols.

At block 720, the processing logic transmits the request for the traffic topology to a host system associated with the service mesh.

At block 730, the processing logic receives, from the host system, a user interface illustrating the traffic topology and corresponding metrics associated with the traffic topology.

Figure 8:
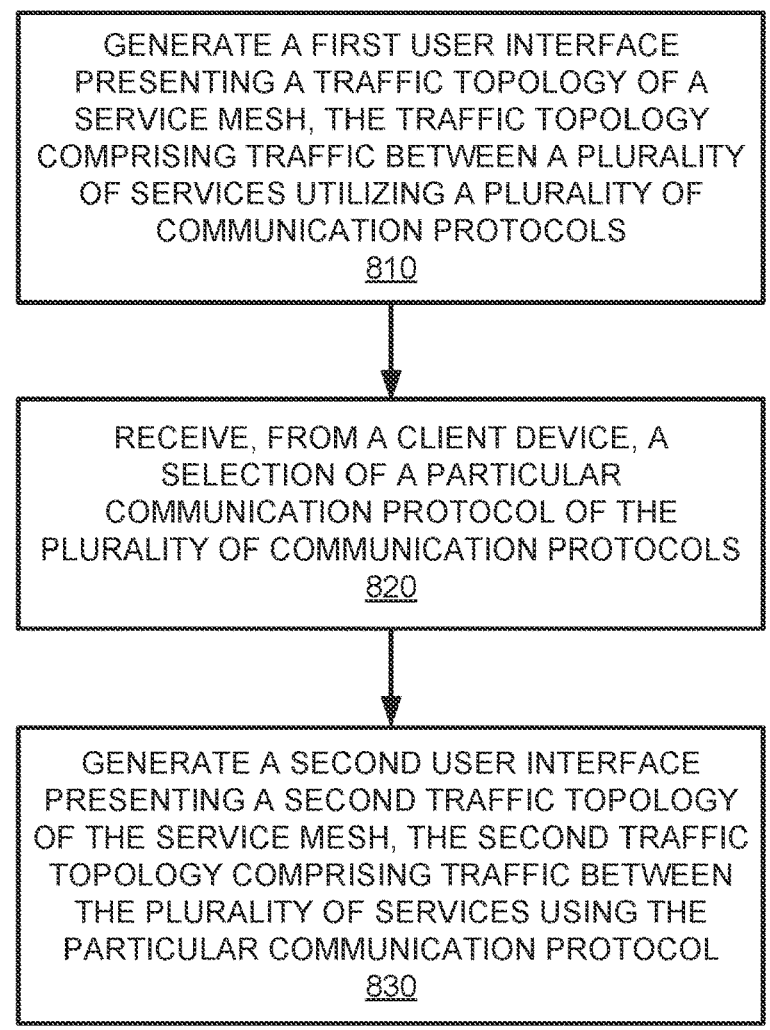
FIG. 8 is a flow diagram of a method of customizing user interfaces in view of a selection of a particular communication protocol, in accordance with some embodiments.

FIG. 8 is a flow diagram of a method 800 of customizing user interfaces in view of a selection of a particular communication protocol, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by topology generation component 162 of FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic generates a first user interface presenting a traffic topology of a service mesh that includes traffic between multiple services utilizing multiple communication protocols.

At block 820, the processing logic receives, from a client device, a selection of a particular communication protocol of the multiple communication protocols.

At block 830, the processing logic generates a second user interface presenting a second traffic topology of the service mesh that includes traffic between the services using the particular communication protocols.

Figure 9:
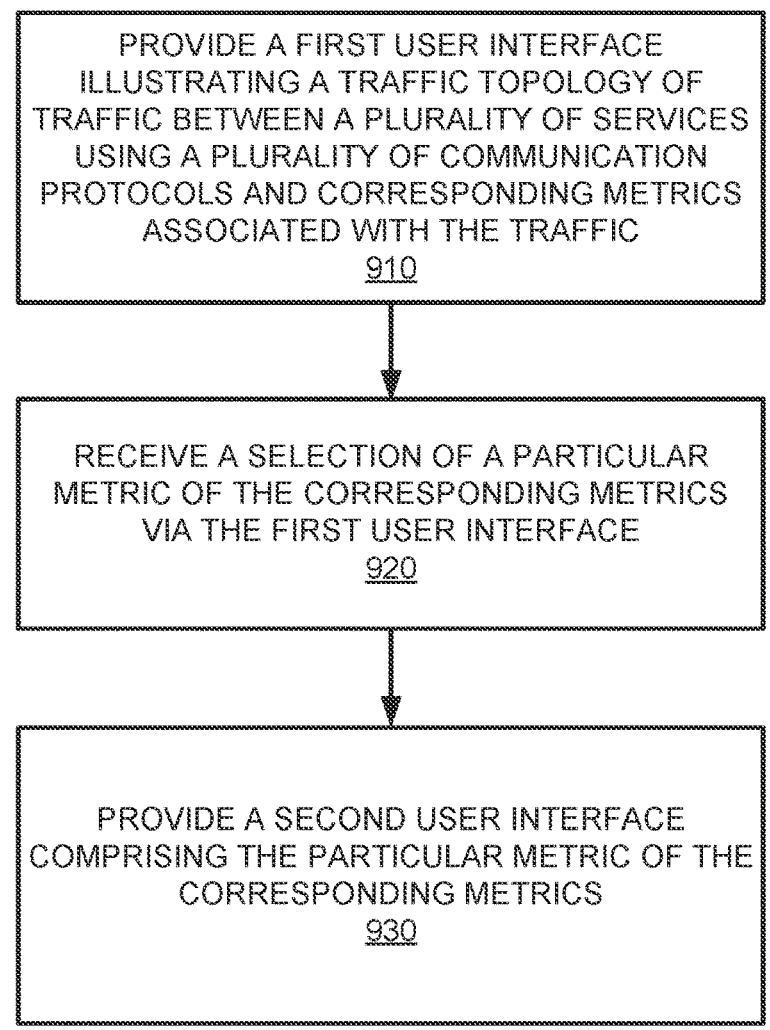
FIG. 9 is a flow diagram of a method of providing user interfaces in view of a selection of a particular metric, in accordance with some embodiments.

FIG. 9 is a flow diagram of a method 900 of providing user interfaces in view of a selection of a particular metric, in accordance with some embodiments. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by processing device 504 of client device 150 of FIG. 5.

With reference to FIG. 9, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

Method 900 begins at block 910, where the processing logic provides a first user interface illustrating a traffic topology of traffic between multiple services using multiple communication protocols and corresponding metrics associated with the traffic.

At block 920, the processing logic receives a selection of a particular metric of the corresponding metrics via the first user interface.

At block 930, the processing logic provides a second user interface that includes the particular metric of the corresponding metrics.

Figure 10:
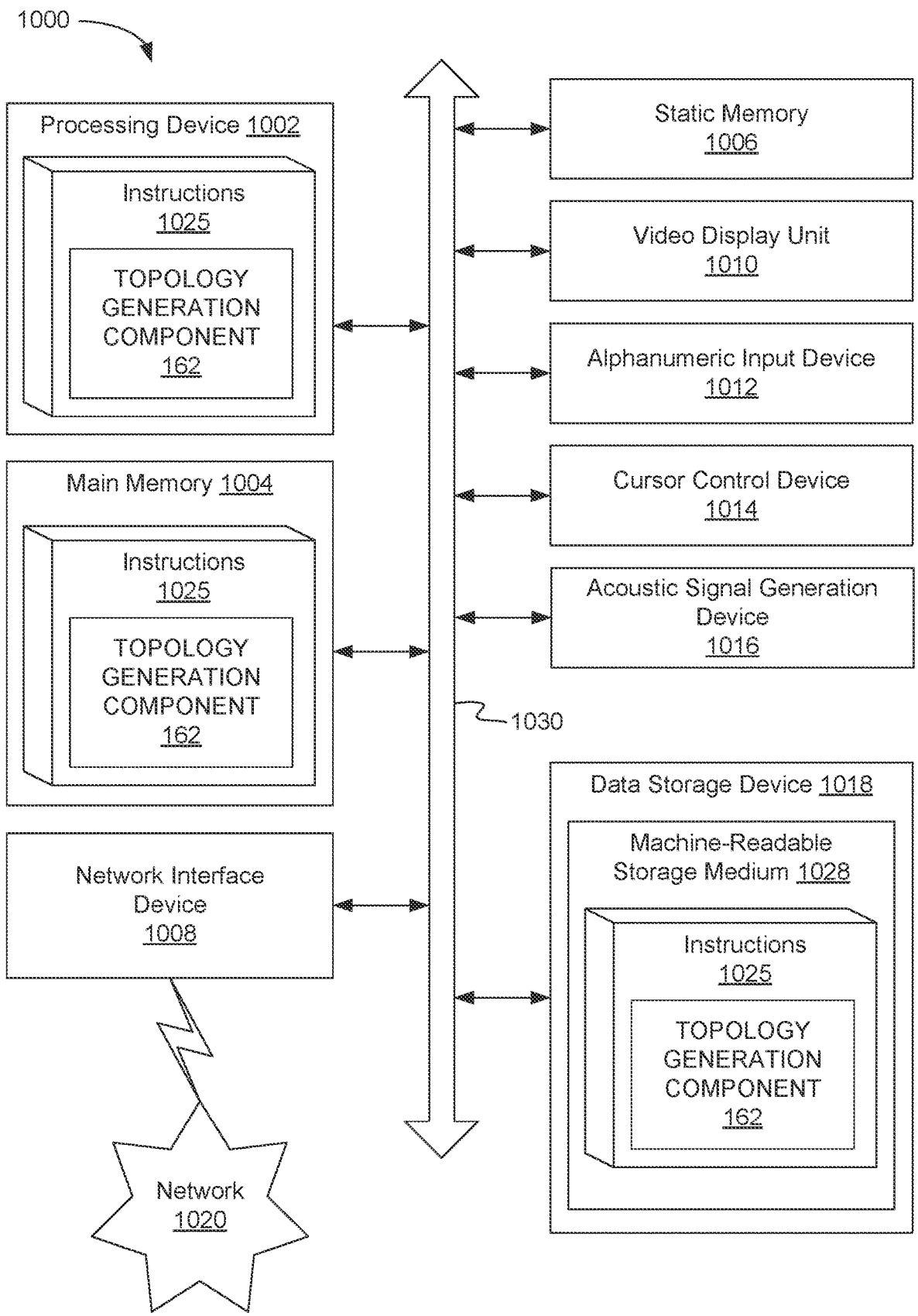
FIG. 10 is a block diagram of an example apparatus that may perform one or more of the operations described herein, in accordance with some embodiments of the present disclosure.

FIG. 10 is a block diagram of an example computing device 1000 that may perform one or more of the operations described herein, in accordance with some embodiments. Computing device 1000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute the operations described herein, in accordance with one or more aspects of the present disclosure, for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions 1025 that may include instructions for a topology generation component, e.g., topology generation component 162 for carrying out the operations described herein, in accordance with one or more aspects of the present disclosure. Instructions 1025 may also reside, completely or at least partially, within main memory 1004 and/or within processing device 1002 during execution thereof by computing device 1000, main memory 1004 and processing device 1002 also constituting computer-readable media. The instructions 1025 may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising: receiving a request for a traffic topology of a service mesh comprising traffic between a plurality of services, the traffic utilizing a plurality of communication protocols; in response to receiving the request, acquiring metric data associated with the traffic between the plurality of services; and generating, by a processing device, the traffic topology of the traffic between the plurality of services using the metric data, the traffic topology illustrating corresponding traffic for one or more of the plurality of communication protocols and one or more metrics associated with the corresponding traffic.

Example 2 is the method of Example 1, wherein the request is received from a client device, the method further comprising: generating a user interface for presenting the traffic topology at the client device; and providing the user interface to the client device.

Example 3 is the method of any of Examples 1-2, further comprising: receiving, from the client device via the user interface, a selection of a particular communication protocol of the plurality of communication protocols; and generating a subsequent user interface for presenting the corresponding traffic for the particular communication protocol and the one or more metrics associated with the particular communication protocol.

Example 4 is the method of any of Examples 1-3, further comprising: receiving, from the client device via the user interface, a selection of a particular metric of the one or more metrics associated with the corresponding traffic; and generating a subsequent user interface for presenting the particular metric associated with the corresponding traffic.

Example 5 is the method of any of Examples 1-4, wherein the request further comprises a defined amount of time to be used in generating the traffic topology, wherein the metric data corresponds to the traffic between the plurality of services during the defined amount of time.

Example 6 is the method of any of Examples 1-5, wherein the one or more metrics comprise a number of bytes of data transmitted between a first service of the plurality of services and a second service of the plurality of services.

Example 7 is the method of any of Examples 1-6, wherein the one or more metrics comprise a number of messages transmitted between a first service of the plurality of services and a second service of the plurality of services.

Example 8 is the method of any of Examples 1-7, wherein the one or more metrics comprise information associated with bidirectional traffic between a first service of the plurality of services and a second service of the plurality of services.

Example 9 is the method of any of Examples 1-8, wherein the plurality of communication protocols comprise one or more of a remote procedure call (RPC), a hypertext transfer protocol (HTTP), or a transmission control protocol (TCP).

Example 10 is a system comprising: a memory; and a processing device, operatively coupled to the memory, to: generate a request for a traffic topology of a service mesh comprising traffic between a plurality of services using a plurality of communication protocols; transmit the request for the traffic topology to a host system associated with the service mesh; and receive, from the host system, a user interface illustrating the traffic topology and corresponding metrics associated with the traffic topology.

Example 11 is the system of Example 10, wherein the processing device is further to: receive, via the user interface, a selection of a particular communication protocol of the plurality of communication protocols; transmit an indication of the particular communication protocol of the plurality of communication protocols to the host system; and receive, from the host system, a subsequent user interface illustrating a subsequent traffic topology and corresponding metrics associated with the traffic topology of the particular communication protocol.

Example 12 is the system of any of Examples 10-11, wherein the processing device is further to: receive, via the user interface, a selection of a particular metric of the corresponding metrics associated with one or more of the plurality of communication protocols; transmit an indication of the particular metric to the host system; and receive, from the host system, a subsequent user interface presenting the particular metric associated with the one or more of the plurality of communication protocols.

Example 13 is the system of any of Examples 10-12, wherein the request further comprises a defined amount of time for the traffic topology and wherein the traffic topology corresponds to the traffic between the plurality of services during the defined amount of time.

Example 14 is the system of any of Examples 10-13, wherein the corresponding metrics comprise metrics associated with bidirectional traffic between the plurality of services.

Example 15 is the system of any of Examples 10-14, wherein the corresponding metrics comprise a number of messages transmitted between a first service of the plurality of services and a second service of the plurality of services.

Example 16 is the system of any of Examples 10-15, wherein the corresponding metrics comprise a number of bytes of data transmitted between a first service of the plurality of services and a second service of the plurality of services.

Example 17 is a non-transitory computer-readable storage medium including instructions that, when executed by a processing device, cause the processing device to: generate, by the processing device, a first user interface presenting a traffic topology of a service mesh, the traffic topology comprising traffic between a plurality of services utilizing a plurality of communication protocols; receive, from a client device, a selection of a particular communication protocol of the plurality of communication protocols; and generate a second user interface presenting a second traffic topology of the service mesh, the second traffic topology comprising traffic between the plurality of services using the particular communication protocol.

Example 18 is the non-transitory computer-readable storage medium of Example 17, wherein the first user interface comprises corresponding metrics associated with the traffic between the plurality of services utilizing the plurality of communication protocols.

Example 19 is the non-transitory computer-readable storage medium of any of Examples 17-18, wherein the corresponding metrics comprise metrics associated with bidirectional traffic between the plurality of services.

Example 20 is the non-transitory computer-readable storage medium of any of Examples 17-19, wherein the corresponding metrics comprise a number of messages transmitted between a first service of the plurality of services and a second service of the plurality of services.

Example 21 is the non-transitory computer-readable storage medium of any of Examples 17-20, wherein the corresponding metrics comprise a number of bytes of data transmitted between a first service of the plurality of services and a second service of the plurality of services.

Example 22 is the non-transitory computer-readable storage medium of any of Examples 17-21, wherein the processing device is further to: receive, from the client device, a second selection of a particular metric of the corresponding metrics; and generate a third user interface presenting the particular metric of the corresponding metrics.

Example 23 is the non-transitory computer-readable storage medium of any of Examples 17-22, wherein the traffic topology corresponds to the traffic between the plurality of services during a defined amount of time.

Example 24 is a method comprising: providing, by a processing device, a first user interface illustrating a traffic topology of traffic between a plurality of services using a plurality of communication protocols and corresponding metrics associated with the traffic; receiving a selection of a particular metric of the corresponding metrics via the first user interface; and providing a second user interface comprising the particular metric of the corresponding metrics.

Example 25 is the method of Example 24, wherein the particular metric comprises a number of bytes of data transmitted between the plurality of services.

Example 26 is the method of any of Examples 24-25, wherein the particular metric comprises a number of messages transmitted between the plurality of services.

Example 27 is the method of any of Examples 24-26, wherein the first user interface is received from a host system in response to a request for the traffic topology.

Example 28 is the method of any of Examples 24-27, further comprising: receiving a subsequent selection of a particular communication protocol of the plurality of communication protocols via the second user interface; and providing a third user interface comprising the particular metric for the particular communication protocol.

Example 29 is the method of any of Examples 24-28, wherein each of the plurality of services is executed using one or more containers.

Example 30 is an apparatus comprising: means for receiving a request for a traffic topology of a service mesh comprising traffic between a plurality of services, the traffic utilizing a plurality of communication protocols; means for in response to receiving the request, acquiring metric data associated with the traffic between the plurality of services; and means for generating the traffic topology of the traffic between the plurality of services using the metric data, the traffic topology illustrating corresponding traffic for one or more of the plurality of communication protocols and one or more metrics associated with the corresponding traffic.

Example 31 is the apparatus of Example 30, wherein the request is received from a client device, the apparatus further comprising: means for generating a user interface for presenting the traffic topology at the client device; and means for providing the user interface to the client device.

Example 32 is the apparatus of any of Examples 30-31, further comprising: means for receiving, from the client device via the user interface, a selection of a particular communication protocol of the plurality of communication protocols; and means for generating a subsequent user interface for presenting the corresponding traffic for the particular communication protocol and the one or more metrics associated with the particular communication protocol.

Example 33 is the apparatus of any of Examples 30-32, further comprising: means for receiving, from the client device via the user interface, a selection of a particular metric of the one or more metrics associated with the corresponding traffic; and means for generating a subsequent user interface for presenting the particular metric associated with the corresponding traffic.

Example 34 is the apparatus of any of Examples 30-33, wherein the request further comprises a defined amount of time to be used in generating the traffic topology, wherein the metric data corresponds to the traffic between the plurality of services during the defined amount of time.

Example 35 is the apparatus of any of Examples 30-34, wherein the one or more metrics comprise a number of bytes of data transmitted between a first service of the plurality of services and a second service of the plurality of services.

Example 36 is the apparatus of any of Examples 30-35, wherein the one or more metrics comprise a number of messages transmitted between a first service of the plurality of services and a second service of the plurality of services.

Example 37 is the apparatus of any of Examples 30-36, wherein the one or more metrics comprise information associated with bidirectional traffic between a first service of the plurality of services and a second service of the plurality of services.

Example 38 is the apparatus of any of Examples 30-37, wherein the plurality of communication protocols comprise one or more of a remote procedure call (RPC), a hypertext transfer protocol (HTTP), or a transmission control protocol (TCP).

Unless specifically stated otherwise, terms such as "receiving," "acquiring," "generating," "transmitting," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving a request for visualizing a traffic topology of a service mesh comprising traffic between a plurality of services, the traffic utilizing a plurality of communication protocols, wherein one of the plurality of services uses two or more different communication protocols in communicating with others of the plurality of services;
   in response to receiving the request, acquiring metric data associated with the traffic between the plurality of services, wherein the metric data of the one of the plurality of services comprise a first metric of request rates of a first communication protocol and a second metric of bytes of data of a second communication protocol of the two or more different communication protocols; and
   generating and visualizing, by a processing device, the traffic topology of the traffic between the plurality of services using the metric data, the traffic topology visualized by a user interface and illustrating corresponding traffic for one or more of the plurality of communication protocols and one or more metrics associated with the corresponding traffic between the plurality of services, the one or more metrics including the first metric and the second metric.

2. The method of claim 1, wherein the request is received from a client device, the method further comprising:
   generating a user interface for presenting the traffic topology at the client device; and
   providing the user interface to the client device.

3. The method of claim 2, further comprising:
   receiving, from the client device via the user interface, a selection of a particular communication protocol of the plurality of communication protocols; and
   generating a subsequent user interface for presenting the corresponding traffic for the particular communication protocol and the one or more metrics associated with the particular communication protocol.

4. The method of claim 2, further comprising:
   receiving, from the client device via the user interface, a selection of a particular metric of the one or more metrics associated with the corresponding traffic; and
   generating a subsequent user interface for presenting the particular metric associated with the corresponding traffic.

5. The method of claim 1, wherein the request further comprises a defined amount of time to be used in generating the traffic topology, wherein the metric data corresponds to the traffic between the plurality of services during the defined amount of time.

6. The method of claim 1, wherein the one or more metrics comprise a number of bytes of data transmitted between a first service of the plurality of services and a second service of the plurality of services.

7. The method of claim 1, wherein the one or more metrics comprise a number of messages transmitted between a first service of the plurality of services and a second service of the plurality of services.

8. The method of claim 1, wherein the one or more metrics comprise information associated with bidirectional traffic between a first service of the plurality of services and a second service of the plurality of services.

9. A system comprising:
   a memory; and a processing device, operatively coupled to the memory, to:
   receive a request for visualizing a traffic topology of a service mesh comprising traffic between a plurality of services, the traffic utilizing a plurality of communication protocols, wherein one of the plurality of services uses two or more different communication protocols in communicating with others of the plurality of services;
   in response to receiving the request, acquire metric data associated with the traffic between the plurality of services, wherein the metric data of the one of the plurality of services comprise a first metric of request rates of a first communication protocol and a second metric of bytes of data of a second communication protocol of the two or more different communication protocols; and
   generate and visualize the traffic topology of the traffic between the plurality of services using the metric data, the traffic topology visualized by a user interface and illustrating corresponding traffic for one or more of the plurality of communication protocols and one or more metrics associated with the corresponding traffic between the plurality of services, the one or more metrics including the first metric and the second metric.

10. The system of claim 9, wherein the request is received from a client device, wherein the processing device is further to:
   generate a user interface for presenting the traffic topology at the client device; and
   provide the user interface to the client device.

11. The system of claim 10, wherein the processing device is further to:
   receive, from the client device via the user interface, a selection of a particular communication protocol of the plurality of communication protocols; and
   generate a subsequent user interface for presenting the corresponding traffic for the particular communication protocol and the one or more metrics associated with the particular communication protocol.

12. The system of claim 10, wherein the processing device is further to:
   receive, from the client device via the user interface, a selection of a particular metric of the one or more metrics associated with the corresponding traffic; and
   generate a subsequent user interface for presenting the particular metric associated with the corresponding traffic.

13. The system of claim 9, wherein the request further comprises a defined amount of time to be used in generating the traffic topology, wherein the metric data corresponds to the traffic between the plurality of services during the defined amount of time.

14. The system of claim 9, wherein the one or more metrics comprise a number of bytes of data transmitted between a first service of the plurality of services and a second service of the plurality of services.

15. The system of claim 9, wherein the one or more metrics comprise a number of messages transmitted between a first service of the plurality of services and a second service of the plurality of services.

16. The system of claim 9, wherein the one or more metrics comprise information associated with bidirectional traffic between a first service of the plurality of services and a second service of the plurality of services.

17. A non-transitory computer-readable storage medium including instructions that, when executed by a processing device, cause the processing device to:
   receive a request for visualizing a traffic topology of a service mesh comprising traffic between a plurality of services, the traffic utilizing a plurality of communication protocols, wherein one of the plurality of services uses two or more different communication protocols in communicating with others of the plurality of services;
   in response to receiving the request, acquire metric data associated with the traffic between the plurality of services, wherein the metric data of the one of the plurality of services comprise a first metric of request rates of a first communication protocol and a second metric of bytes of data of a second communication protocol of the two or more different communication protocols; and
   generate and visualize, by the processing device, the traffic topology of the traffic between the plurality of services using the metric data, the traffic topology visualized by a user interface and illustrating corresponding traffic for one or more of the plurality of communication protocols and one or more metrics associated with the corresponding traffic between the plurality of services, the one or more metrics including the first metric and the second metric.

18. The non-transitory computer-readable storage medium of claim 17, wherein the request is received from a client device, wherein the processing device is further to:
   generate a user interface for presenting the traffic topology at the client device; and
   provide the user interface to the client device.

19. The non-transitory computer-readable storage medium of claim 18, wherein the processing device is further to:
   receive, from the client device via the user interface, a selection of a particular communication protocol of the plurality of communication protocols; and
   generate a subsequent user interface for presenting the corresponding traffic for the particular communication protocol and the one or more metrics associated with the particular communication protocol.

20. The non-transitory computer-readable storage medium of claim 18, wherein the processing device is further to:
   receive, from the client device via the user interface, a selection of a particular metric of the one or more metrics associated with the corresponding traffic; and
   generate a subsequent user interface for presenting the particular metric associated with the corresponding traffic.

* * * * *